United States Patent
Lin et al.

(10) Patent No.: US 7,986,931 B2
(45) Date of Patent: Jul. 26, 2011

(54) RFID READER AND CIRCUIT AND METHOD FOR ECHO CANCELLATION THEREOF

(75) Inventors: Chih-Hung Lin, Tainan County (TW); Chin-Fu Li, Puyan Township (TW); Chia-Jen Yu, Taipei County (TW); Jiunn-Tsair Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1134 days.

(21) Appl. No.: 11/736,008

(22) Filed: Apr. 17, 2007

(65) Prior Publication Data

US 2008/0136645 A1 Jun. 12, 2008

Related U.S. Application Data

(60) Provisional application No. 60/869,559, filed on Dec. 12, 2006.

(51) Int. Cl.
*H04B 7/00* (2006.01)
(52) U.S. Cl. .... 455/296; 455/418; 455/570; 379/406.08
(58) Field of Classification Search ............. 455/296
See application file for complete search history.

(56) References Cited

U.S. PATENT DOCUMENTS

| 5,572,545 A | 11/1996 | Hachem et al. |
| 2002/0191779 A1* | 12/2002 | Pham ................. 379/406.08 |
| 2006/0098765 A1 | 5/2006 | Thomas et al. |

OTHER PUBLICATIONS

"1st Office Action of China counterpart application", issued on Jan. 22, 2010, p. 1-p. 4.
Article Titled "A Robust Variable Step-Size LMS-Type Algorithm: Analysis and Simulations" jointly authored by Aboulnasr et al., IEEE Transactions on Signal Processing, vol. 45, No. 3, Mar. 1997.(pp. 631-639).

* cited by examiner

*Primary Examiner* — Duc Nguyen
*Assistant Examiner* — Ajibola Akinyemi
(74) *Attorney, Agent, or Firm* — Jianq Chyun IP Office

(57) ABSTRACT

An echo cancellation circuit for an RFID reader and the method thereof are provided. The echo cancellation circuit includes a gain calculator, a gain adjustment circuit, and a subtraction circuit. The gain calculator provides a complex gain value according to a carrier signal and a received signal through an adaptive algorithm. The gain adjustment circuit is coupled to the gain calculator. The gain adjustment circuit multiplies the carrier signal by the complex gain value, and outputs the result of the multiplication. The subtraction circuit is coupled to the gain adjustment circuit. The subtraction circuit subtracts the output of the gain adjustment circuit from the received signal, and then provides the result of the subtraction as the output signal of the echo cancellation circuit.

17 Claims, 7 Drawing Sheets

RFID READER AND CIRCUIT AND METHOD FOR ECHO CANCELLATION THEREOF

CROSS-REFERENCE TO RELATED APPLICATION

This application claims the priority benefit of U.S. application Ser. No. 60/869,559, filed Dec. 12, 2006. All disclosure of the U.S. application is incorporated herein by reference.

BACKGROUND OF THE INVENTION

1. Field of the Invention

The present invention relates to a radio frequency identification (RFID) reader. More particularly, the present invention relates to a circuit and a method for echo cancellation of an RFID reader.

2. Description of the Related Art

FIG. 1 is a schematic diagram showing a conventional RFID reader 101 and several RFID tags, for example three RFID tags 102-104. The reader 101 emits ultra high frequency (UHF) electromagnetic waves to enable the tags 102-104 so that the tags 102-104 can backscatter data to the reader 101. FIG. 2 is a schematic diagram showing the circuit of a conventional RFID reader 101. The RFID reader 101 includes an RF oscillator 201, a power splitter 202, a power amplifier (PA) 203, a modulator 204, a circulator 205, an antenna 206, a mixer 207, a demodulator 209, and a control block 208.

The RF oscillator 201 provides a carrier signal. The power splitter 202 relays the carrier signal to the PA 203 and the down converter mixer 207. The PA 203 amplifies the carrier signal. The control block 208 provides the data for an RFID tag as the modulating signal to the modulator 204. The modulator 204 performs a modulation operation with the amplified carrier signal and the modulating signal, and then outputs the modulated signal. The circulator 205 relays the modulated signal to the antenna 206 and the modulated signal is transmitted to the tag. Later, when the tag responds by transmitting data back to the reader 101, the antenna 206 receives the backscatter signal and the circulator 205 relays the signal to the mixer 207. The mixer 207 shifts the received signal into a low frequency band and then provides the shifted signal to the demodulator 209. This transmission signal from the tag is also modulated. The demodulator 209 performs the demodulation to retrieve the data sent by the tag. Finally, a digital signal processor (DSP) included in the control block 208 receives the retrieved data for further processing.

The circulator 205 has three ports, namely, P1-P3. When the reader 101 is receiving data from a tag, the circulator 205 relays the signal received at the antenna 206 from the port P2 to the port P3. At the same time, the carrier signal originating from the RF oscillator 201 is also relayed by the circulator 205 from the port P1 to the port P3. Consequently, the mixer 207 not only receives the signal sent by the tag, but also receives the carrier signal leaking from the port P1 to the port P3. Here the leakage carrier signal is also known as "echo".

The leakage carrier signal is very undesirable because the difference of power level between the leakage carrier signal and the desired signal from the tag can be as large as 110 dB. Even though a typical circulator has signal isolation at the range of 30-40 dB from the port P1 to the port P3, then the power level difference can still be as large as 80 dB, as shown in FIG. 3. FIG. 3 is a schematic diagram showing the normalized power spectral density of the received signal before the mixer 207 at the port P3. The received signal includes the leakage carrier signal 302 and the desired signal 301. In this case, the leakage carrier signal 302 virtually overwhelms the desired signal 301, making it very difficult for the reader 101 to retrieve the desired signal 301 from the received signal. Ideally, the circulator 205 should have a signal isolation of 110 dB from the port P1 to the port P3, but such a requirement is impractical because no such circulator exists. As a result, the echo problem greatly reduces the sensitivity and the spurious-free dynamic range (SFDR) of the reader 101.

SUMMARY OF THE INVENTION

The present invention provides an echo cancellation circuit for an RFID reader. This RFID reader is improved by the echo cancellation circuit and features better sensitivity, broader SFDR, and a simple design easy to be implemented. The performance of echo carrier suppression of the echo cancellation circuit is optimal.

The present invention also provides an RFID reader including an echo cancellation circuit. This RFID reader features the same improvements as those mentioned above.

The present invention further provides an echo cancellation method for an RFID reader. This method features the same improvements as those mentioned above.

According to an embodiment of the present invention, an echo cancellation circuit for an RFID reader is provided. The echo cancellation circuit includes a gain calculator, a gain adjustment circuit, and a subtraction circuit. The gain calculator provides a complex gain value according to a carrier signal and a received signal through an adaptive algorithm. The gain adjustment circuit is coupled to the gain calculator. The gain adjustment circuit multiplies the carrier signal by the complex gain value, and outputs the result of the multiplication. The subtraction circuit is coupled to the gain adjustment circuit. The subtraction circuit subtracts the output of the gain adjustment circuit from the received signal, and then provides the result of the subtraction as the output signal of the echo cancellation circuit.

According to another embodiment of the present invention, an RFID reader is provided, which includes a backend module, a second electronic component, an antenna, and an echo cancellation circuit. The backend module provides a carrier signal and an amplified modulated signal. The backend module also processes the data transmitted by an RFID tag. The amplified modulated signal is generated based on the carrier signal and carries data for the RFID tag. The second electronic component has a first port, a second port, and a third port. The second electronic component is coupled to the backend module with the first port. The second electronic component transfers the amplified modulated signal from the first port to the second port, transfers a leakage carrier signal from the first port to the third port, transfers a backscatter signal from the second port to the third port, and outputs a combination including the backscatter signal and the leakage carrier signal at the third port as a received signal. The antenna is coupled to the second port of the second electronic component for transmitting the amplified modulated signal to the RFID tag, receiving the backscatter signal from the RFID tag, and transmitting the backscatter signal to the second port of the second electronic component. The echo cancellation circuit is coupled to the backend module and the third port of the second electronic component. The echo cancellation circuit multiplies the carrier signal by a complex gain value, subtracts the result of the multiplication from the received signal, and then outputs the result of the subtraction as an output signal to the backend module. The output signal carries the data transmitted by the RFID tag.

According to another embodiment of the present invention, an echo cancellation method is provided, which includes the following steps. First, provide a complex gain value according to a carrier signal and a received signal. Multiply the carrier signal by the complex gain value, and then subtract the result of the multiplication from the received signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
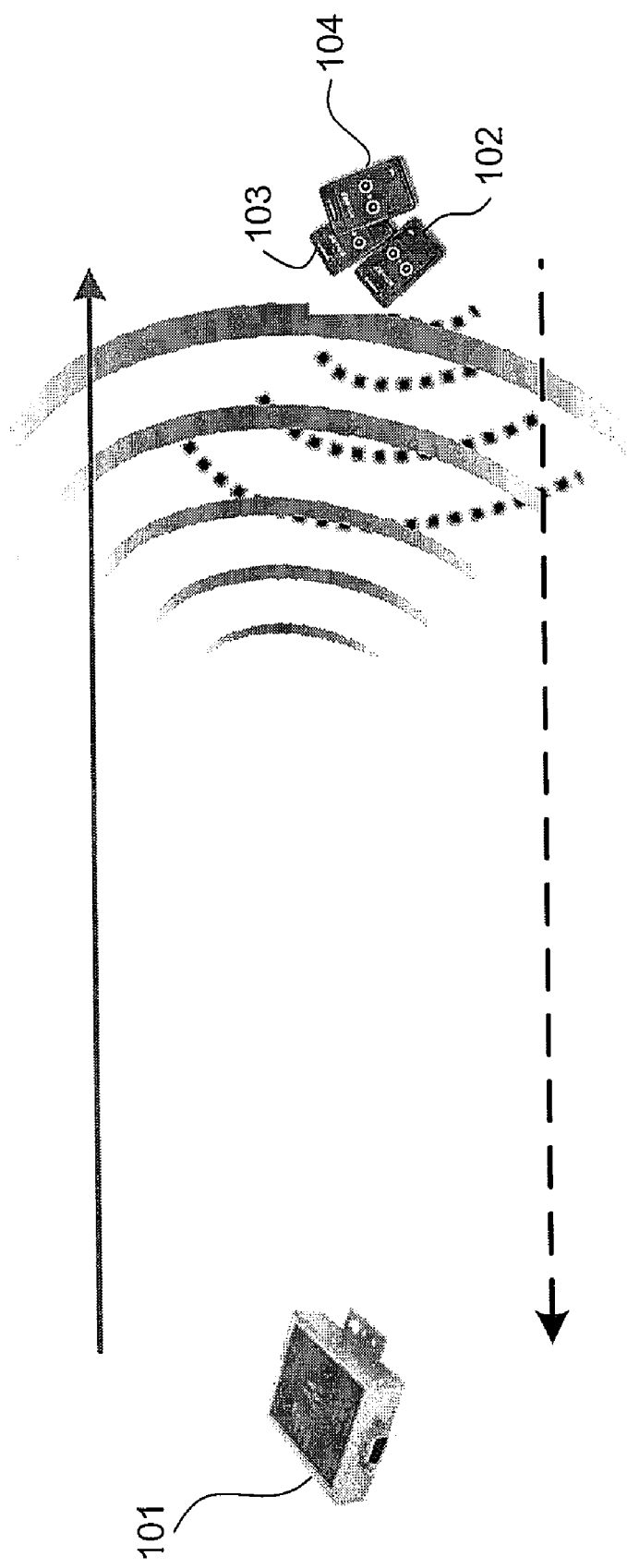
FIG. 1 is a schematic diagram showing the communication between a conventional RFID reader and several RFID tags.

Reference will now be made in detail to the present preferred embodiments of the invention, examples of which are illustrated in the accompanying drawings. Wherever possible, the same reference numbers are used in the drawings and the description to refer to the same or like parts.

Figure 4:
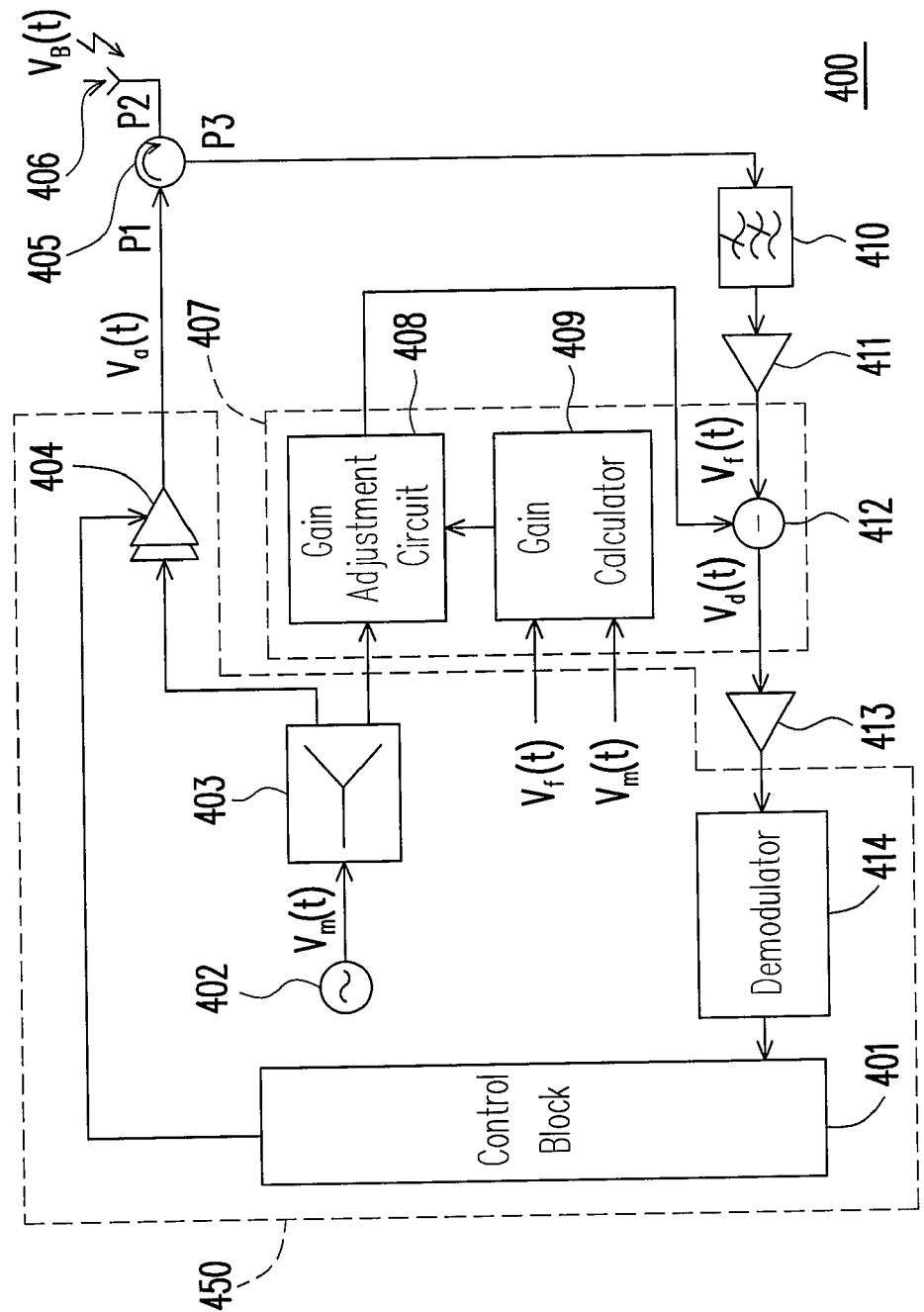
FIG. 4 is a schematic diagram showing the circuit of an RFID reader according to an embodiment of the present invention.

FIG. 4 is a schematic diagram showing the circuit of an RFID reader 400 including an echo cancellation circuit 407 according to an embodiment of the present invention. The RFID reader 400 includes a backend module 450, a circulator 405, an antenna 406, a band-pass filter (BPF) 410, two low-noise amplifiers (LNAs) 411 and 413, and the echo cancellation circuit 407. The backend module 450 includes a control block 401, an RF oscillator 402, a power splitter 403, a PA 404, and a demodulator 414. Among the components of the RFID reader 400, the control block 401, the RF oscillator 402, the power splitter 403, the circulator 405, the antenna 406, and the demodulator 414 are analogous to their counterparts in the conventional RFID reader 101. The power splitter 403 may be replaced with a coupler or any device with the same signal transferring capability as that of the power splitter 403. The circulator 405 may be replaced with a coupler or any device with the same signal transferring capability as that of the circulator 405.

The PA 404 is more than a simple amplifier to amplify the transmitter signal. First, the PA 404 amplifies the carrier signal $V_m$ via the power splitter 403 and receives data for an RFID tag from the control block 401. Next, the PA 404 performs a modulation operation with the carrier signal $V_m$ and the data for the tag as the modulating signal. Finally, the PA 404 outputs the signal $V_a$, which is the amplified modulated signal, to the circulator 405 for transmission to the tag via the antenna 406.

Later, when the tag responds by transmitting the backscatter signal $V_B$ to the RFID reader 400, the backscatter signal $V_B$ is received at the antenna 406 and then is relayed by the circulator 405 to the BPF 410. The port P3 of the circulator 405 not only outputs the backscatter signal $V_B$, but also outputs a leakage carrier signal $V_m'$ as well. Here the combination including the backscatter signal $V_B$ and the leakage carrier signal $V_m'$ is denoted as the received signal $V_f$. The BPF 410 filters out irrelevant noises in the received signal $V_f$ and then outputs the received signal $V_f$ to the LNA 411. The BPF 410 may be optional if the backscatter signal $V_B$ is sufficiently noise-free or the component coupled to the port P3 can deal with the noises in the received signal $V_f$. The LNA 411 amplifies the received signal $V_f$ and in the same time suppresses background noises in the received signal $V_f$, and then outputs the amplified received signal $V_f$ to the echo cancellation circuit 407. The noise figure of the LNA 411 has to be small because the noise figure of the receiver part of the RFID reader 400 is confined by the noise figure of the LNA 411. The gain of the LNA 411 is intermediate. The echo cancellation circuit 407 eliminates the leakage carrier signal $V_m'$ (echo) in the received signal $V_f$ by suppressing the leakage carrier signal $V_m'$ to a power level approaching that of the backscatter signal $V_B$. The echo cancellation circuit 407 outputs the result of the suppression as the signal $V_d$ to the LNA 413. The LNA 413 amplifies the signal $V_d$ and in the same time suppresses background noises in the signal $V_d$, and then outputs the amplified signal $V_d$ to the demodulator 414. The gain of the LNA 413 is higher than the LNA 411. The demodulator 414 performs a demodulation to retrieve the data transmitted by the tag from the signal $V_d$. Finally, the demodulator 414 outputs the retrieved data to a DSP included in the control block 401 for further processing.

In this embodiment, the echo cancellation circuit 407 and the demodulator 414 are not sensitive enough to process the backscatter signal $V_B$ directly. The backscatter signal $V_B$ has to be amplified before it is received by the echo cancellation circuit 407. However, the backscatter signal $V_B$ goes along with the leakage carrier signal $V_m'$, which dominates the backscatter signal $V_B$ and is undesirable. Therefore the amplification of the backscatter signal $V_B$ is implemented in two stages. The LNAs 411 and 413 perform the first and the second stages, respectively. The LNA 411 may be optional if the echo cancellation circuit 407 is sensitive enough to deliver the backscatter signal $V_B$ directly. Similarly, the LNA 413 may be optional if the demodulator 414 is sensitive enough to process the backscatter signal $V_B$ directly.

The echo cancellation circuit 407 includes a gain calculator 409, a gain adjustment circuit 408, and a subtraction circuit 412. The gain calculator 409 provides a complex gain value α according to the carrier signal $V_m$ and the received signal $V_f$. The gain adjustment circuit 408 is coupled to the gain calculator 409. The gain adjustment circuit 408 multiplies the carrier signal $V_m$ by the complex gain value α, and then outputs the result of the multiplication to the subtraction circuit 412. The subtraction circuit 412 is coupled to the gain adjustment circuit 408. The subtraction circuit 412 subtracts the output of the gain adjustment circuit 408 from the received signal $V_f$, and then provides the result of the subtraction as the output signal $V_d$ of the echo cancellation circuit 407. In other words, the relation among the signals $V_m$, $V_f$ and $V_d$ is represented in the expression $V_d = V_f - V_m \times \alpha$. Since α is a complex number involving amplitude and phase adjustment, the gain adjustment circuit 408 must be able to perform such a multiplication of complex numbers. There is a delay from the carrier signal $V_m$ leaving the power splitter 403 to the corresponding received signal $V_f$ reaching the echo cancellation circuit 407. In order to accommodate this delay and achieve a better performance of echo cancellation, a delay device, such as a delay loop (not shown), may be coupled between the power splitter 403 and the gain adjustment circuit 408 to delay the carrier signal $V_m$ so that the carrier signal $V_m$ provided to the gain adjustment circuit 408 can be synchronous with the leakage carrier signal $V_m'$ in the received signal $V_f$.

The purpose of the gain calculator 409 is providing an optimal complex gain value α so that the output $V_m \times \alpha$ of the gain adjustment circuit 408 eliminates the leakage carrier signal $V_m'$ in the received signal $V_f$. The optimal complex gain value can be obtained according to the following expression.

$$\alpha = E[V_m \times V_f^*]/E[V_m \times V_m^*] \quad (1)$$

$V_f^*$ and $V_m^*$ are the complex conjugates of the received signal $V_f$ and the carrier signal $V_m$, respectively. E[ ] means the expectation operation of the signal inside the brackets. The gain calculator 409 may calculate the complex gain value in the equation (1) with any existing adaptive algorithm or with long-term statistics over a predetermined period. For example, $E[V_m \times V_f^*]$ and $E[V_m \times V_m^*]$ in the equation (1) may be calculated with long-term statistics over a predetermined time period. In this case, E[ ] means the long-term time average of the signal inside the brackets. The gain calculator 409 in this embodiment may calculate the complex gain value with a variable step-size least-mean-square (LMS) algorithm or robust variable step-size LMS (RVS-LMS) algorithm. In the latter case, the RVS-LMS algorithm may be summarized by the following recursive equations:

$$e(k) = V_f(k) - \alpha(k-1) \times V_m(k-1) \quad (2)$$

$$p(k) = \eta \times p(k) + (1-\eta) \times e(k) \times e(k-1) \quad (3)$$

$$u(k) = \rho \times u(k-1) + \gamma \times p^2(k) \quad (4)$$

$$\alpha(k) = \alpha(k-1) + u(k) \times e(k) \times V_m^*(k) \quad (5)$$

In equations (2)-(5) shown above, k is the iteration index, e(k) is the error signal, p(k) is the time averaged estimation of the autocorrelation of e(k) and e(k-1); the step size u(k) is the square of the time averaged estimation of p(k); $0 < \eta < 1$, $0 < \rho < 1$ and $\gamma > 0$ are all predetermined weighted coefficients.

The gain calculator 409 may include a DSP to perform the operations required by the adaptive algorithm. Alternatively, the gain calculator 409 may use the DSP included in the control block 401 to carry out the operations required by the adaptive algorithm.

The advantage of the adaptive algorithm is compatibility and flexibility. Due to the adaptive algorithm, the echo cancellation circuit 407 can cancel leakage carrier signals of a broad range of modulation schemes, such as double-sideband amplitude-shift keying (DSB ASK), single-sideband (SSB) ASK, phase reverse (PR) ASK supported by the electronic product code (EPC) global standard, and other modulation schemes supported by RFID standards other than EPC. Also due to the adaptive algorithm, the echo cancellation circuit 407 can cancel carrier signals transmitted by other RFID readers as well. In other words, the echo cancellation circuit 407 can overcome in-band interference. Furthermore, the adaptive algorithm is an online algorithm, which constantly and continuously adapts to the changes of the received signal $V_f$ such as a change of the modulation scheme or of some relevant statistics of the leakage carrier signal $V_m'$. Therefore the complex gain value α provided by the gain calculator 409 is always optimal.

Figure 2:
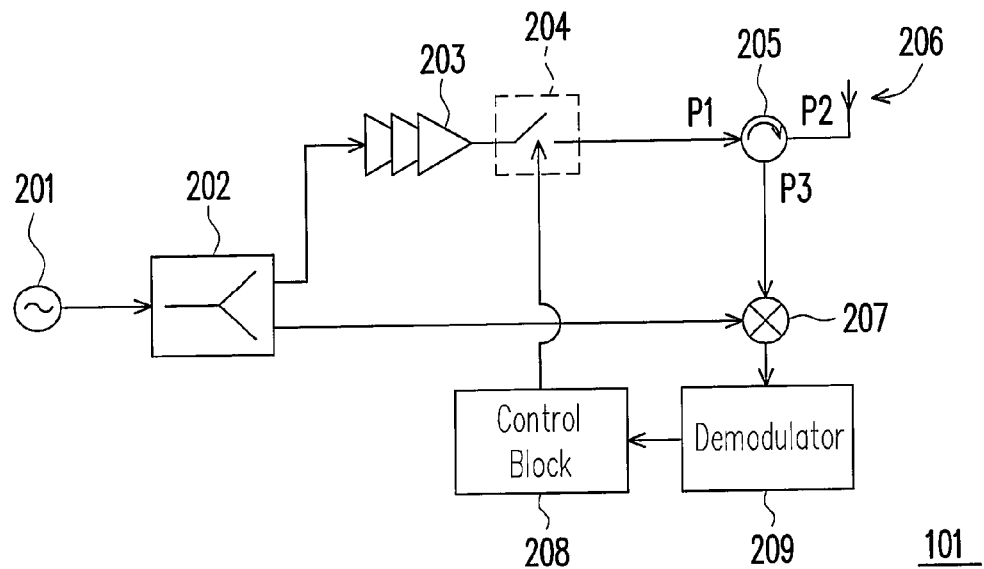
FIG. 2 is a schematic diagram showing the circuit of a conventional RFID reader.
Figure 3:
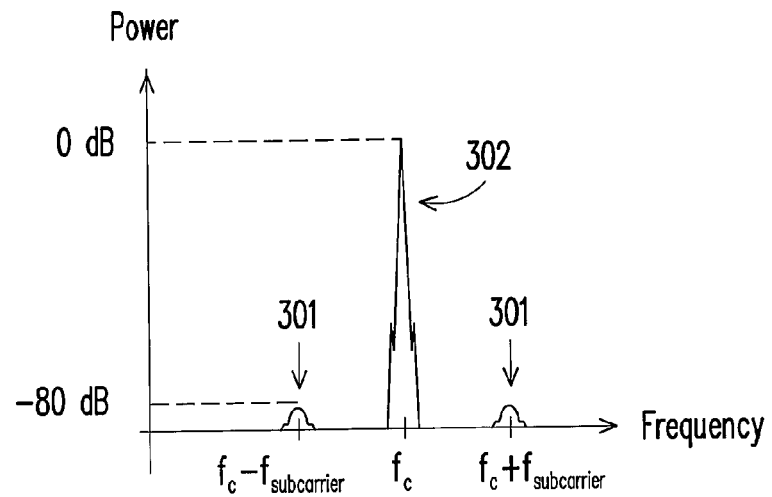
FIG. 3 is a schematic diagram showing the normalized power spectral density (PSD) of a received signal including a leakage carrier signal and a signal from an RFID tag output by a circulator of a conventional RFID reader.
Figure 5A:
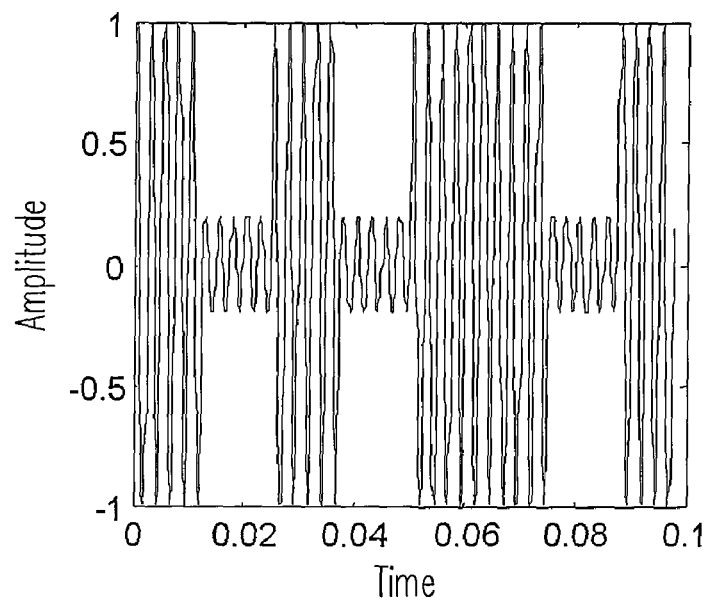
FIG. 5A is a schematic diagram showing the waveform of a signal transmitted from an RFID reader to a tag in an experiment according to an embodiment of the present invention.
Figure 5B:
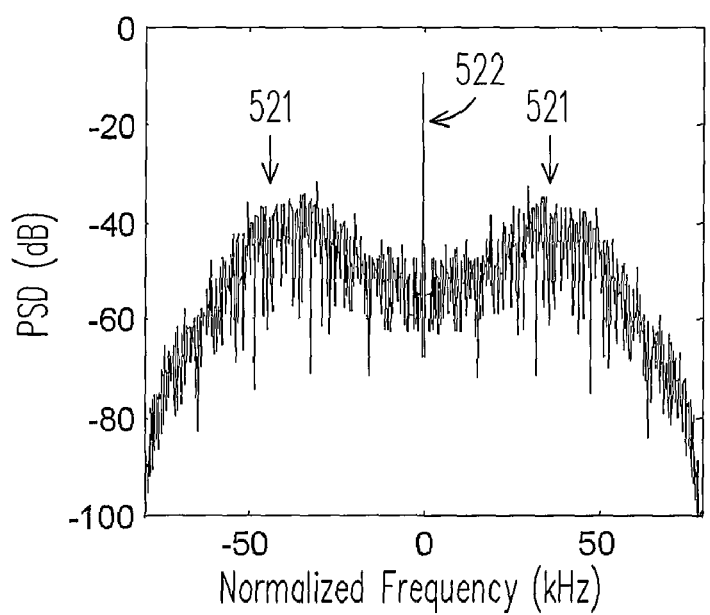
FIG. 5B is a schematic diagram showing the PSD of a signal received by the demodulator of a conventional RFID reader without echo cancellation.
Figure 5C:
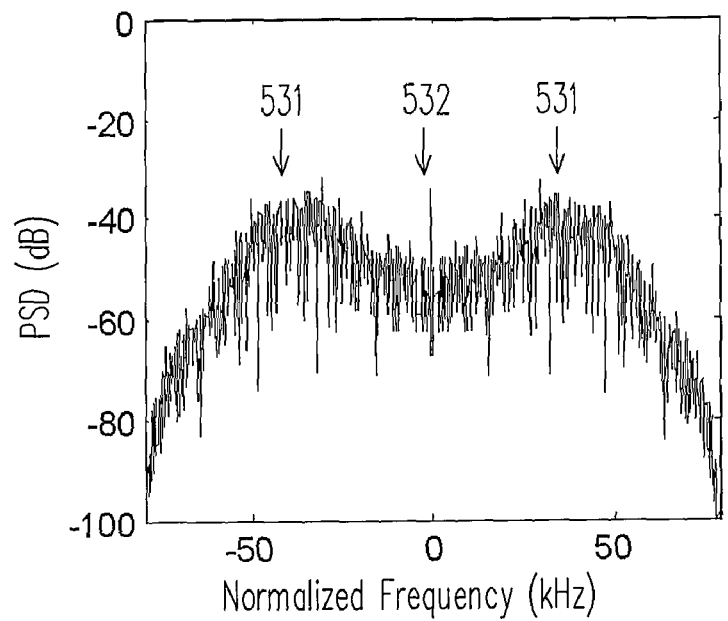
FIG. 5C is a schematic diagram showing the PSD of a signal received by the demodulator of an RFID reader according to an embodiment of the present invention.
Figure 5D:
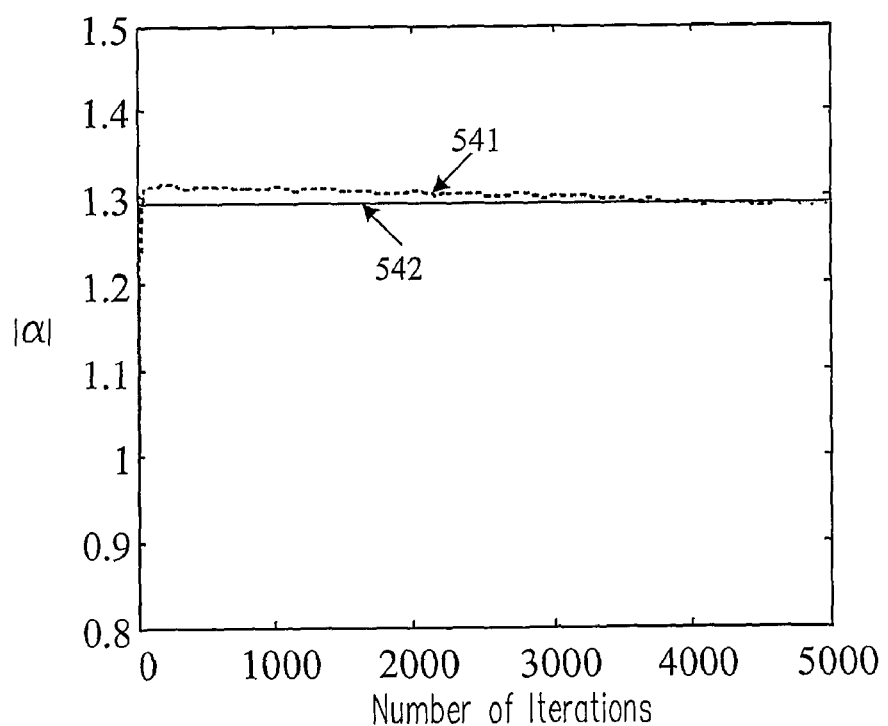
FIG. 5D is a schematic diagram showing the convergence of the amplitude gain value calculated using an adaptive algorithm according to an embodiment of the present invention.

FIGS. 5A-5D shows the results of the first simulation experiment according to this embodiment. FIG. 5A shows the waveform of the signal $V_a$ transmitted by the reader 400 to an RFID tag. The signal $V_a$ is encoded using pulse interval encoding (PIE). FIG. 5B shows the PSD of the input signal received by the demodulator 209 of the conventional RFID reader 101 in FIG. 2. As shown by FIG. 5B, the difference of power level between the leakage carrier signal 522 and the backscatter signal 521 from the tag is about 30 dB. FIG. 5C shows the PSD of the input signal $V_d$ received by the demodulator 414 of the RFID reader 400 in FIG. 4, in which leakage carrier signal 532 is suppressed by the echo cancellation circuit 407 to the same power level as that of the backscatter signal 531. A comparison of FIGS. 5B and 5C shows that the echo cancellation capability of the RFID reader 400 is far more superior to that of the conventional RFID reader 101. FIG. 5D shows the convergence of the amplitude gain value |α| (curve 541) towards the optimal value (line 542) in equation (1) through a number of iterations of the variable step-size LMS algorithm in the first simulation experiment. The step size may be adjusted to accelerate the convergence of |α|.

Figure 6A:
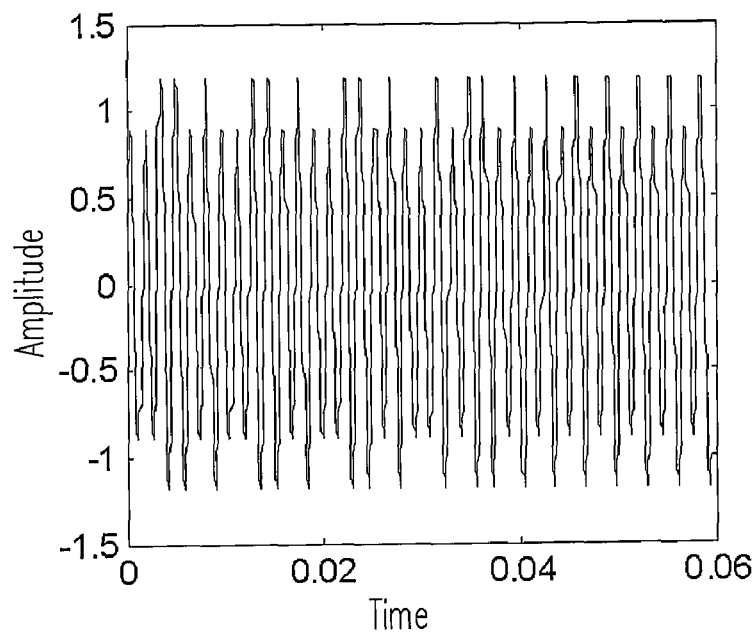
FIG. 6A is a schematic diagram showing the waveform of a signal transmitted from an RFID tag to a reader in an experiment according to an embodiment of the present invention.
Figure 6B:
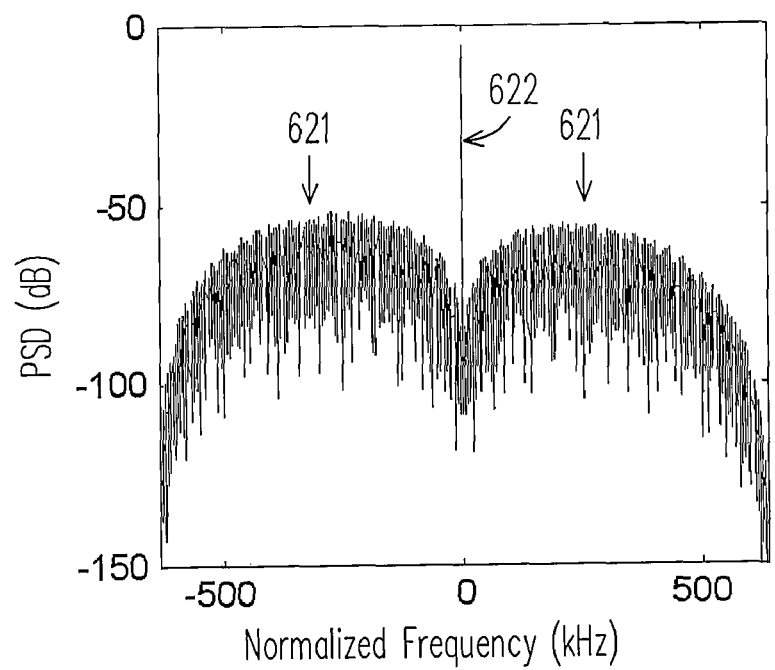
FIG. 6B is a schematic diagram showing the PSD of a signal received by the demodulator of a conventional RFID reader without echo cancellation.
Figure 6C:
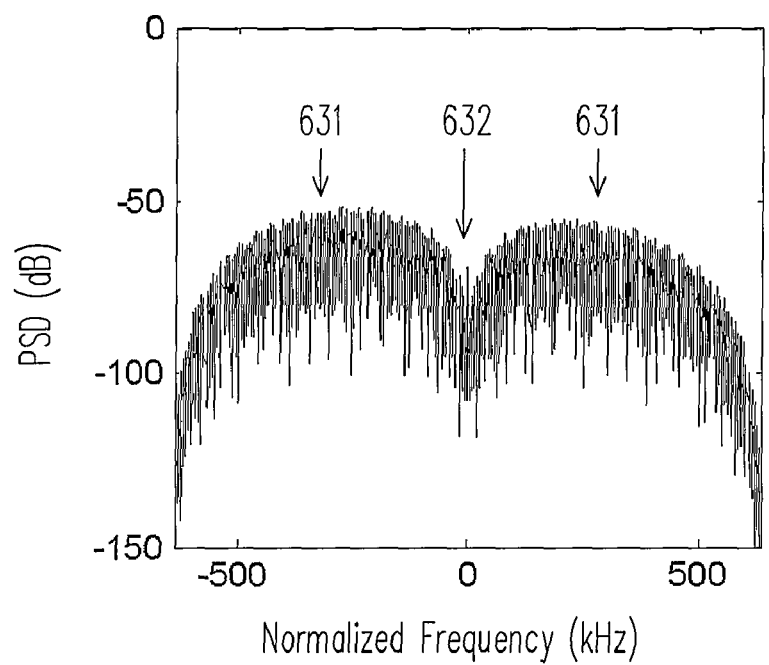
FIG. 6C is a schematic diagram showing the PSD of a signal received by the demodulator of an RFID reader according to an embodiment of the present invention.
Figure 6D:
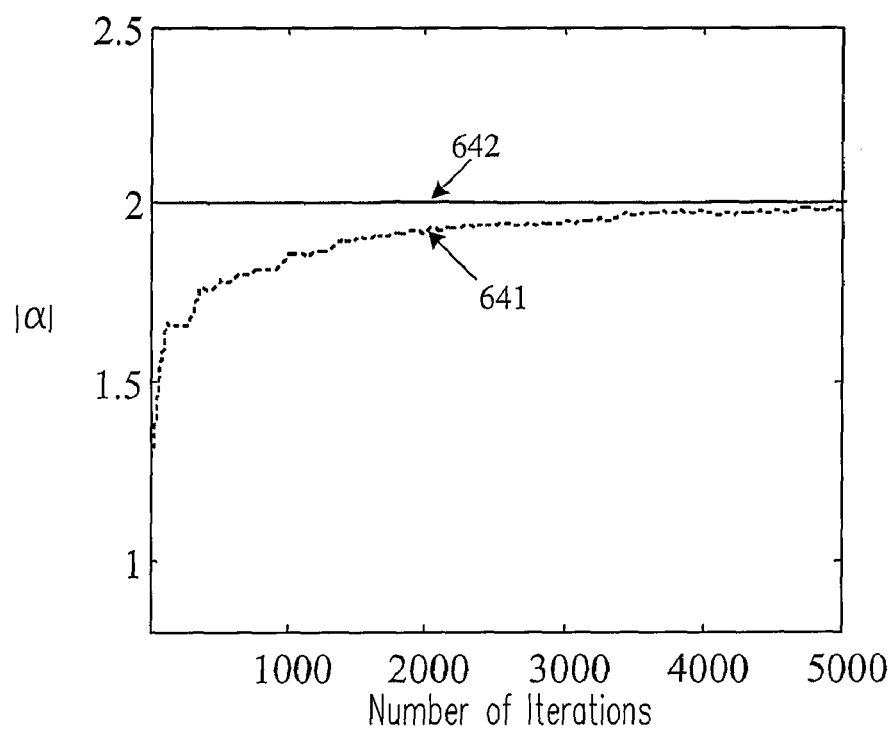
FIG. 6D is a schematic diagram showing the convergence of the amplitude gain value calculated using an adaptive algorithm according to an embodiment of the present invention.

FIGS. 6A-6D shows the results of the second simulation experiment according to this embodiment. FIG. 6A shows the waveform of the backscatter signal transmitted by an RFID tag to the reader 400. The backscatter signal is encoded using FM0 supported by the EPC global standard. FIG. 6B shows the PSD of the input signal received by the demodulator 209 of the conventional RFID reader 101 in FIG. 2. As shown by FIG. 6B, the difference of power level between the leakage carrier signal 622 and the backscatter signal 621 from the tag is about 50 dB. FIG. 6C shows the PSD of the input signal $V_d$ received by the demodulator 414 of the RFID reader 400 in FIG. 4, in which the leakage carrier signal 632 is suppressed by the echo cancellation circuit 407 to a power level lower than that of the backscatter signal 631. A comparison of FIGS. 6B and 6C shows that the echo cancellation capability of the RFID reader 400 is far more superior to that of the conventional RFID reader 101. FIG. 6D shows the convergence of the amplitude gain value |α| (curve 641) towards the optimal value (line 642) in equation (1) through a number of iterations of the variable step-size LMS algorithm in the second simulation experiment. The step size may be adjusted to accelerate the convergence of |α|.

Table 1 below is a comparison of the sensitivity and SFDR of the conventional RFID reader 101 and the improved RFID reader 400 in the third simulation experiment according to this embodiment. As shown in Table 1, we set the scenario as the following conditions. The signal-to-noise ratio (SNR) and the specification of LNA 411 is the same in both conventional RFID reader and this embodiment of the present invention. The SNR is 10 dB at demodulator output. The power of backscatter signal from tag is −80 dBm. The gain, noise figure and third order intercept point (IP3) of LNA 411 is respectively 5 dB, 1.5 dB and 0 dB. The gain, noise figure and third order intercept point (IP3) of LNA 413 is respectively 20 dB, 2.5 dB and 15.

As shown in Table 1, the RFID reader 400 features an improvement of sensitivity of 14.48 dB and an improvement of SFDR of 9.65 dB in the above scenario.

TABLE 1

Comparison of sensitivity and SFDR

|  | Sensitivity | SFDR |
|---|---|---|
| RFID reader 101 | −85.95 dBm | 17.30 dB |
| RFID reader 400 | −100.43 dBm | 26.95 dB |
| Improvement | 14.48 dB | 9.65 dB |

In addition to the RFID reader 400 and the echo cancellation circuit 407 of this embodiment, the present invention also includes a method of echo cancellation for an RFID reader. An embodiment of the method is already disclosed in the operation of the echo cancellation circuit 407. Therefore the method is not further discussed.

In summary, the circuit and method for echo cancellation provided by the present invention have the advantages of better sensitivity and broader SFDR. The circuit has a simple design easy to be implemented. The performance of the echo cancellation is optimal. Moreover, by using an online adaptive algorithm for echo cancellation, the present invention can constantly adapt to the changes of the leakage carrier signal and eliminate a broad range of carrier signals with various parameters and characteristics.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An echo cancellation circuit for an RFID reader, comprising: a gain calculator for providing a complex gain value according to a carrier signal and a received signal, wherein the complex gain value is calculated according to the following formula:

$$\alpha = E[V_m \times V_f^*]/E[V_m \times V_m^*],$$

wherein $\alpha$ is the complex gain value, $V_f$ is the received signal, $V_f^*$ is a complex conjugate of the received signal, $V_m$ is the carrier signal, $V_m^*$ is a complex conjugate of the carrier signal, E[ ] means the expectation operation of the signal inside the brackets;

a gain adjustment circuit coupled to the gain calculator for multiplying the carrier signal by the complex gain value, and outputting the result of the multiplication; and a subtraction circuit coupled to the gain adjustment circuit for subtracting the output of the gain adjustment circuit from the received signal, and providing the result of the subtraction as an output signal of the echo cancellation circuit.

2. The echo cancellation circuit of claim 1, wherein the gain calculator calculates the complex gain value with an adaptive algorithm.

3. The echo cancellation circuit of claim 2, wherein the adaptive algorithm is a variable step-size LMS algorithm or robust variable step-size LMS algorithm.

4. The echo cancellation circuit of claim 1, wherein the gain calculator calculates the complex gain value with long-term statistics over a predetermined time period.

5. An RFID reader, comprising:

a backend module for providing a carrier signal and an amplified modulated signal and for processing data transmitted by an RFID tag, wherein the amplified modulated signal is generated based on the carrier signal and carries data for the RFID tag;

a second electronic component comprising a first port, a second port, and a third port, coupled to the backend module with the first port, configure for transferring the amplified modulated signal from the first port to the second port, for transferring a leakage carrier signal from the first port to the third port, for transferring a backscatter signal from the second port to the third port, and for outputting a combination including the backscatter signal and the leakage carrier signal at the third port as a received signal;

an antenna coupled to the second port of the second electronic component for transmitting the amplified modulated signal to the RFID tag, receiving the backscatter signal from the RFID tag, and transmitting the backscatter signal to the second port of the second electronic component; and an echo cancellation circuit coupled to the backend module and the third port of the second electronic component, configured for multiplying the carrier signal by a complex gain value, for subtracting the result of the multiplication from the received signal, and for outputting the result of the subtraction as an output signal to the backend module, wherein the output signal carries data transmitted by the RFID tag, and the complex gain value is calculated according to the following formula:

$$\alpha = E[V_m \times V_f^*]/E[V_m \times V_m^*],$$

wherein $\alpha$ is the complex gain value, $V_f$ is the received signal, $V_f^*$ is a complex conjugate of the received signal, $V_m$ is the carrier signal, $V_m^*$ is a complex conjugate of the carrier signal, E[ ] means the expectation operation of the signal inside the brackets.

6. An RFID reader of claim 5, wherein the echo cancellation circuit comprising:

a gain calculator for providing the complex gain value according to the carrier signal and the received signal;

a gain adjustment circuit coupled to the gain calculator for multiplying the carrier signal by the complex gain value, and outputting the result of the multiplication; and a subtraction circuit coupled to the gain adjustment circuit for subtracting the output of the gain adjustment circuit from the received signal, and providing the result of the subtraction as the output signal.

7. The RFID reader of claim 6, wherein the gain calculator calculates the complex gain value with an adaptive algorithm.

8. The RFID reader of claim 7, wherein the adaptive algorithm is a variable step-size LMS algorithm or robust variable step-size LMS (RVS-LMS) algorithm.

9. The RFID reader of claim 6, wherein the gain calculator calculates the complex gain value with long-term statistics over a predetermined time period.

10. The RFID reader of claim 5, wherein the backend module comprises:

a control block for providing the data for the RFID tag and for processing the data transmitted by the RFID tag;

an RF oscillator for providing the carrier signal;
a first electronic component coupled to the RF oscillator, comprising at least three ports, configured for receiving the carrier signal at one of the three ports and transferring the carrier signal to each of the other two ports;
a power amplifier (PA) coupled to the control block and the first electronic component, configured for amplifying the carrier signal, for performing a modulation operation with the amplified carrier signal and the data for the tag as the modulating signal, and for outputting the amplified modulated signal; and
a demodulator coupled between the echo cancellation circuit and the control block, configured for performing a demodulation to retrieve the data transmitted by the RFID tag from the output signal of the echo cancellation circuit and for outputting the retrieved data to the control block.

11. The RFID reader of claim 10, wherein the first electronic component is a power splitter or a coupler; the second electronic component is a circulator or a coupler.

12. The RFID reader of claim 10, further comprising:
a band-pass filter (BPF) coupled between the third port of the second electronic component and the echo cancellation circuit, configured for filtering out irrelevant noises in the received signal.

13. The RFID reader of claim 10, further comprising:
a first low-noise amplifier (LNA) coupled between the third port of the second electronic component and the echo cancellation circuit, configured for amplifying the received signal and in the same time suppressing background noises in the received signal; and
a second LNA coupled between the echo cancellation circuit and the demodulator, configured for amplifying the output signal of the echo cancellation circuit and in the same time suppressing background noises in the output signal.

14. The RFID reader of claim 10, further comprising:
a delay device coupled between the first electronic component and the echo cancellation circuit for delaying the carrier signal so that the carrier signal provided to the echo cancellation circuit is synchronous with the leakage carrier signal in the received signal.

15. An echo cancellation method for an RFID reader, comprising:
providing a complex gain value according to a carrier signal and a received signal;
multiplying the carrier signal by the complex gain value; and
subtracting the result of the multiplication from the received signal, wherein the complex gain value is calculated according to the following formula:

$$\alpha = E[V_m \times V_f^*]/E[V_m \times V_m^*],$$

wherein $\alpha$ is the complex gain value, $V_f$ is the received signal $V_f^*$ is a complex conjugate of the received signal, $V_m$ is the carrier signal $V_m^*$ is a complex conjugate of the carrier signal, E[ ] means an expectation operation of a signal inside the brackets.

16. The echo cancellation method of claim 15, wherein the complex gain value is calculated with an adaptive algorithm.

17. The echo cancellation method of claim 15, wherein the complex gain value is calculated with long-term statistics over a predetermined time period.

* * * * *